(12) United States Patent
Strasser et al.

(10) Patent No.: US 6,427,041 B1
(45) Date of Patent: Jul. 30, 2002

(54) ARTICLE COMPRISING A TILTED GRATING IN A SINGLE MODE WAVEGUIDE

(75) Inventors: Thomas Andrew Strasser, Warren; Paul Stephen Westbrook, Chatham, both of NJ (US)

(73) Assignee: Fitel USA Corp., Norcross, GA (US)

( * ) Notice: Subject to any disclaimer, the term of this patent is extended or adjusted under 35 U.S.C. 154(b) by 38 days.

(21) Appl. No.: 09/584,071

(22) Filed: May 31, 2000

(51) Int. Cl.[7] ................................................. G02B 6/34
(52) U.S. Cl. .......................................................... 385/37
(58) Field of Search ...................................... 385/37, 10

(56) References Cited

U.S. PATENT DOCUMENTS

| | | | | |
|---|---|---|---|---|
| 5,740,292 A | * | 4/1998 | Strasser ........................ | 385/37 |
| 5,832,156 A | | 11/1998 | Strasser et al. ................ | 385/48 |
| 6,005,999 A | * | 12/1999 | Singh et al. ................... | 385/37 |
| 6,009,222 A | | 12/1999 | Dong et al. ................... | 385/127 |
| 6,104,852 A | * | 8/2000 | Kashyap ...................... | 385/123 |
| 6,292,606 B1 | * | 9/2001 | Riant et al. ................... | 385/37 |

FOREIGN PATENT DOCUMENTS

| | | | |
|---|---|---|---|
| EP | 0 767 391 A2 | 9/1996 | ............ G02B/6/16 |
| EP | 0 829 740 A2 | 9/1997 | ............ G02B/6/16 |

OTHER PUBLICATIONS

Haggans, C. W., "Narrow–Band Rejection Filters with Negligible Backreflection Using Tilted Photoinduced Gratings in Single–Mode Fibers", *IEEE Photonics Technology Letters, US, IEEE Inc.,* New York, vol. 10, No. 5, May 1, 1998, pp. 690–692.

Holmes, M. J. et al., "Novel Fibre Design For Narrow–Band Symmetr Response Sidetap Filters With Suppressed Leaky Mode Resonance", 25th European Conference On Optical Communication. ECOC'99 Conference Proceedings of ECOC'99. 25th European Conference on Optical Communication, Nice, France, Sep. 1999, pp. 216–217.

Broderick, N. G. R. et al., "High–power chirped–pulse all–fiber amplification system based on large–mode–area fiber gratings", *Optics Letters, Optical Society of America,* Washington, US, vol. 24, No. 8, Apr. 15, 1999, pp. 566–568.

Haggans et al., *IEEE Photonics Technology Letters,* "Narrow–Band Rejection Filters with Negligible Backreflection Using Tilted Photoinduced Gratings in Single–Mode Fibers", pp. 690–692, vol. 10, No. 5, May 5, 1998.

Holmes et al., *ECOC '98,* "Ultra Narrow–Band Optical Fibre Sidetap Filters", pp. 137–138, Sep. 20–24, 1998.

(List continued on next page.)

*Primary Examiner*—Hemang Sanghavi
*Assistant Examiner*—Scott Knauss

(57) ABSTRACT

A refractive index grating according to this invention is a tilted grating in a single mode optical waveguide, with a photosensitivity profile that includes at least one "tuning region" in the waveguide core. Appropriate choice of the photosensitivity profile of the waveguide can result in a "supernull" in the $LP_{01,f}$ to $LP_{01,b}$ coupling. That is to say, the angular range of the tilt angle $\theta$ over which the core mode coupling is essentially zero (i.e., <−30 dB) can be substantially increased, to more than 0.1°, or even 0.2 or 0.5°, as compared to the angular range obtainable without a "tuning region" in the waveguide core. The increased angular range provides for improved manufacturability of the grating. In preferred embodiments the grating has a large cladding loss (>20 dB) and bandwidth (>20 nm). A method of trimming a grating is also disclosed.

11 Claims, 4 Drawing Sheets

OTHER PUBLICATIONS

Holmes et al., *ECOC'99*, "Novel Fibre Design for Narrow–Band Symmetric Response SideTap Filters with Suppressed Leaky Mode Resonance", pp. 216–217, Sep. 26–30, 1999.

Brilland et al., *Electronics Letters*, "Slanted Gratings UV–Written in Photosensitive Cladding Fibre", vol. 35, No. 3, pp. 234–235, Feb. 4, 1999.

Riant et al., "Gain Equalization with Optimized Slanted Bragg Grating on Adapted Fibre for Multichannel Long–Haul Submarine Transmission", pp. 147–149.

Dong et al., "A Complete Solution for the Suppression of Cladding Mode Coupling Loss in Fiber Bragg Gratings", pp. PD3–1—PD3–3.

Espindola et al., "Low Noise, High Gain, High Conversation Effeicity L–Band EDFA", pp. WD4–1—WD4–4.

Delevaque et al., "Optical Fiber Design for Strong Gratings Photoimprinting with Radiation Mode Suppression", pp. 343–346.

\* cited by examiner

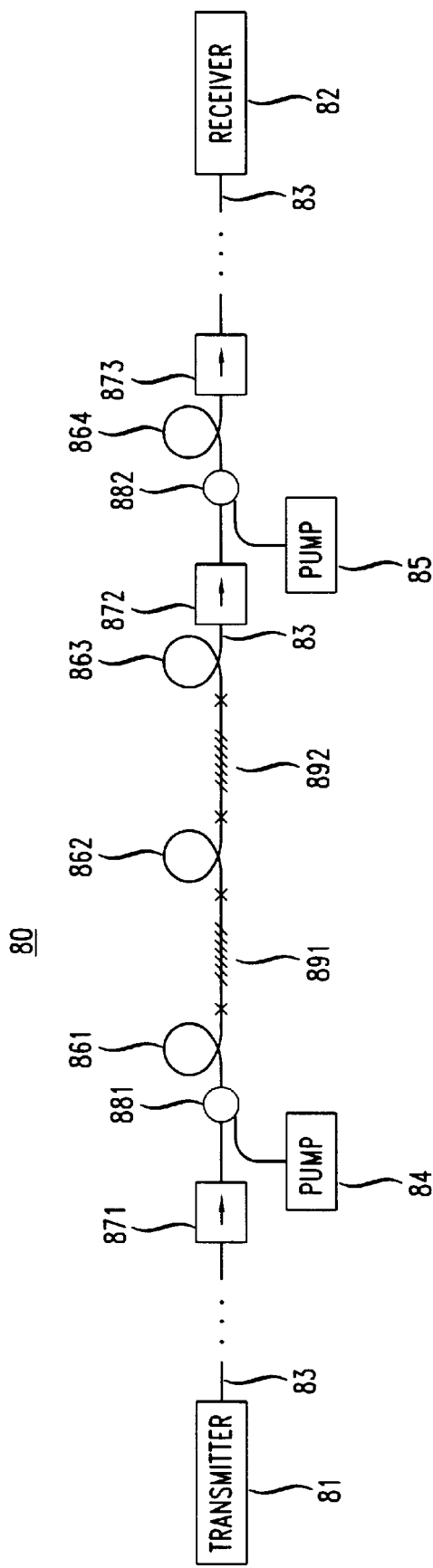

ARTICLE COMPRISING A TILTED GRATING IN A SINGLE MODE WAVEGUIDE

REFERENCE TO RELATED APPLICATIONS

The subject matter of the instant application is related to the subject matter of concurrently filed U.S. patent application Ser. No. 09/584,072 by T. A. Strasser et al., titled "Article Comprising a Bragg Grating in a Few-Moded Optical Waveguide, filed May 31, 2000, incorporated by reference.

FIELD OF THE INVENTION

This invention pertains to tilted gratings in single mode waveguides, typically a single mode optical fiber, and to optical communication systems that comprise such gratings.

BACKGROUND

Bragg gratings in single mode waveguides typically couple a forward core-guided mode to backreflected modes in the core and the cladding. In at least some cases, it is desirable to control the relative strengths of these couplings to achieve a desired function. For instance, the coupling to backward-propagating cladding modes in single mode fibers may be used in loss filters. This typically requires that the undesirable core mode reflection be minimized in comparison to the cladding mode coupling.

The mode coupling strengths of gratings generally depend on the waveguide photosensitivity profile and the electric field of a given mode, both of which are largely fixed at the time of grating formation. A grating parameter which can be changed to alter the relative strength of the mode couplings is the tilt of the grating with respect to the waveguide axis. However, in prior art waveguides the degree of control that is achievable by means of the grating tilt is quite limited. For instance, in prior art single mode waveguides, the angular range of the tilt angle $\theta$ over which a given mode coupling substantially is zero (defined herein as less than −30 dB) is quite limited, typically 0.1° or less. Such gratings are difficult to manufacture.

Tilted gratings in optical fiber are known. See, for instance, U.S. Pat. No. 5,740,292, which discloses tilted refractive index gratings for coupling light in a fundamental mode (e.g., $LP_{01}$) into a higher order mode (e.g., $LP_{11}$). Such a grating can find a variety of uses, e.g., as a wavelength-dependent loss element with abrupt wavelength dependence. See also U.S. Pat. No. 5,832,156, which discloses a tilted grating in a dispersive optical waveguide tap.

Thus, there exists a need for a tilted waveguide grating in a single mode waveguide that can provide a broader tilt angle range of substantially zero coupling into the backwards core mode. This application discloses such a tilted waveguide grating. Furthermore, prior art tilted Bragg gratings typically have relatively low cladding loss (typically substantially less than 20 dB) as well as relatively low bandwidth (typically substantially less than 20 nm). However, there is a need for tilted Bragg gratings in single mode optical waveguides that not only are readily manufacturable but that also have relatively large cladding loss (e.g., >20 dB) and relatively large bandwidth (e.g., >20 nm). Such gratings can, for instance, advantageously be used in Er-doped fiber amplifiers to reject undesired ASE (amplified spontaneous emission). See, for instance, R.P. Espindola et al., paper WD4, "Optical Amplifiers and Their Application" (OAA), 1999 Nara, Japan.

Prior art tilted Bragg grating filters in fibers with complex radial photosensitivity profile typically have a photosensitive cladding. For instance, M. J. Holmes et al., ECOC '98, September 1998, Madrid, Spain, pages 137–138, disclose sidetap filters that comprise a tilted Bragg grating in single mode fiber. The fiber had a non-photosensitive core dopant, and a photosensitive cladding doped with germania, to which boron was added in order to reduce the cladding refractive index to match the deposition tube. The fiber thus had a conventional refractive index profile, with the core refractive index greater than the cladding index, but had zero photosensitivity in the core and a non-zero photosensitivity in the cladding. See FIGS. 1a and 1b below. See also E. Delevaque et al., Optical Fiber Communication Conference 1995, Paper PD5; C. W. Haggans et al., IEEE Photonics Technology Letters, Vol. 10(5), May 1998, page 690; I. Riant et al., Optical Fiber Communication Conference 1999, Paper ThJ6-1/147; L. Dong et al., Bragg Gratings, Photosensitivity and Poling in Glass Waveguides Conference, 1999, Paper PD3; and L. Brilland et al., Electronics Letters, Vol. 35(3), Feburary 1999, page 234.

The above-cited Delevaque and Dong papers describe fiber designs in which core and cladding photosensitivity are adjusted to reduce cladding mode loss in untilted gratings.

M. J. Holmes et al., ECOC '99, Sep. 26–30, 1999, Nice, France, pages I-216–217 disclose a fiber for sidetap filters. The fiber had a non-photosensitive core dopant for normalized radius less than 0.4, a combination of a non-photosensitive core dopant and germania for normalized radius 0.4–1, and a photosensitive cladding doped with germania out to a normalized radius of 3.5, to which boron was added to reduce the cladding index to match the deposition tube. The germania concentrations for the regions 0.4–1.0 and 1.0–3.5 were in the ratio 0.6–1 in order to obtain the required relative photosensitivity. See FIGS. 2a and 2b below. The above cited 1999 Holmes et al. paper thus discloses fiber in which the core has two different photosensitivity levels, with the cladding also being photosensitive. The photosensitivity profile was chosen to optimize the wavelength dependence of the cladding mode loss spectrum for gain flattening filter applications. The Bragg grating in this fiber is limited to applications as a weak narrow bandwidth filter. Thus, there exists a need for a fiber grating that can readily be made to have very low core mode reflection, and that has large cladding mode loss (preferably greater than 20 dB) over a large bandwidth (preferably greater than 20 nm). Practice of the present invention is advantageous in prior art narrow bandwidth applications because it will provide an even lower level of core mode reflection.

GLOSSARY AND DEFINITIONS

For ease of exposition the discussion herein will generally refer to optical fibers. It will be appreciated, however, that similar results are obtainable in other optical waveguides, e.g., in planar waveguides.

By a "regular null" we mean herein a tilt angle region in a tilted ("blazed") fiber Bragg grating that has a core mode coupling for light of a predetermined wavelength that is less than −30 dB over only a small (typically less than 0.1°) angular range of the tilt angle. See, for instance, FIGs. 1a and 1b. Regular nulls occur for many tilt angles.

By a "super null" we mean two (or possibly more) regular nulls that occur at closely spaced blaze angles, thereby making the core mode coupling at the predetermined wavelength very low (typically less than −30 dB) over a relatively large (more than 0.1°, desirably more than 0.2°, or even 0.50 or more) range of tilt angles between the regular nulls.

Modes of the guided light are designated $LP_{mn}$. in conventional fashion, with m and n being integers. For instance, $LP_{01}$ is the fundamental mode. $LP_{01,f}$ refers to the forward propagating fundamental mode, and $LP_{01,b}$ refers to the backward propagating fundamental mode.

"Photosensitivity" refers to the refractive index change in the waveguide that results if an appropriately doped waveguide is exposed to actinic radiation, typically UV radiation.

By "cladding mode loss" we mean herein waveguide loss which results from grating coupling of a core guided mode to cladding modes.

By the "band width" of a tilted Bragg grating we mean herein the wavelength interval over which the cladding loss is greater than 3 dB.

SUMMARY OF THE INVENTION

In a broad aspect the instant invention is embodied in an article that comprises a tilted Bragg grating of novel design in a single mode waveguide, the tilted grating selected to provide a relatively large (exemplarily >0.1°) range of tilt angle θ wherein there is <−30 dB coupling of radiation of predetermined wavelenght λ from a forward propagating core mode (e.g., $LP_{01,f}$) into a backward propagating core mode (e.g., $LP_{01,b}$), whereby manufacture of the tilted grating is facilitated. The relatively large range of tilt angle constitutes a "super null", achieved through appropriate choice of the photosensitivity profile of the fiber core.

Furthermore, preferred Bragg gratings according to the invention have a relatively large cladding loss, typically in excess of 20 dB, and have relatively large bandwidth, typically greater than 20 nm, also attained through appropriate choice of the photosensitivity in the core. Frequently, but not necessarily, there is no photosensitivity in the cladding.

More specifically, the invention is embodied in an article that comprises a tilted refractive index grating in an optical waveguide, typically a single mode optical fiber. The grating has a tilt angle θ and extends longitudinally over at least a portion of the single mode optical waveguide. The waveguide has a core and a cladding that surrounds the core, the waveguide has a dopant distribution selected to provide a radial refractive index. profile n(r) and a radial photosensitivity profile p(r), where n and p are the refractive index and the photosensitivity, respectively, and r is the radial coordinate of the optical waveguide, where p(r) varies as a function of r in the core, with p(r) having at least two different levels of photosensitivity in the core, said tilted refractive index grating having a coupling constant κ(θ) that determines the coupling between a forward propagating core mode (e.g., LPoI,f) of wavelenght λ and a reflected core mode (e.g., $LP_{01,b}$) of wavelength λ.

Significantly, the photosensitivity profile p(r) is selected such that p(r) has at least one tuning region of zero or low photosensitivity, and n(r) and p(r) are selected such that κ(θ) is less than −30 dB over a range of θ that is more than about 0.1°, preferably more than 0.2° or even 0.5°, whereby manufacture of a tilted refractive index grating having substantially no reflected core mode at wavelength λ is facilitated. In preferred embodiments p(r) is selected such that the grating has a cladding loss in excess of 20 dB and a bandwidth in excess of 20 nm.

A feature of the invention is doping such that the refractive index profile n(r) differs from the photosensitivity profile p(r). As those skilled in the art know, doping of silica with Ge or P increases the refractive index and provides photosensitivity for ultraviolet (UV) radiation. On the other hand, doping of silica with Al increases the refractive index but does not provide photosensitivity, and doping with F or B reduces the refractive index and does not provide photosensitivity, although B may enhance the photosensitivity of other dopants. Other dopants may also be useful for tailoring n(r) and p(r).

It will be understood that appropriate choice of n(r) and p(r) results in a supernull in the coupling constant for the predetermined wavelength λ. The presence of the supernull makes the tilted grating relatively easy to manufacture, as compared to prior art gratings wherein p(r) is proportional to n(r), and which consequently have only regular nulls.

BRIEF DESCRIPTION OF THE DRAWINGS

FIG. 8 schematically depicts an optical fiber communication system including a grating according to the invention.

DETAILED DESCRIPTION

Figure 1A:
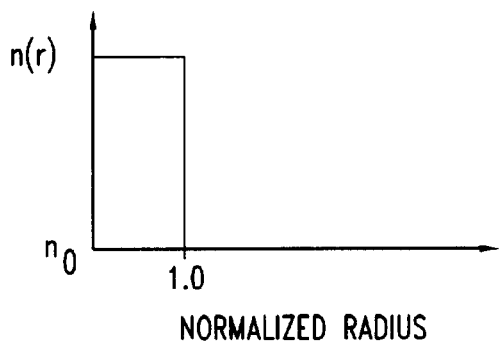
FIGs. 1a and 1b schematically depict the refractive index profile n(r) and the photosensitivity profile p(r) of a prior art fiber.
Figure 1B:
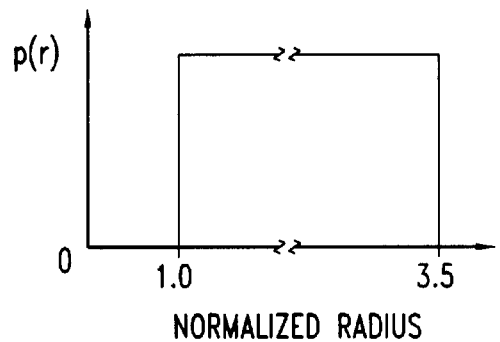

FIG. 1 schematically illustrates a prior art fiber wherein the refractive index profile is not proportional to the photosensitivity profile. See M. J. Holmes et al., ECOC '98 (op.cit.). The fiber comprises a tilted Bragg grating that serves as a sidetap filter. The fiber has a non-photosensitive core dopant (e.g., Al), and a photosensitive cladding doped with germania and boron, such that the cladding index matched the index of the (silica) substrate tube. In the figures, $n_0$ is the refractive index of pure vitreous silica. The absolute magnitude of the photosensitivity is arbitrary.

Figure 2A:
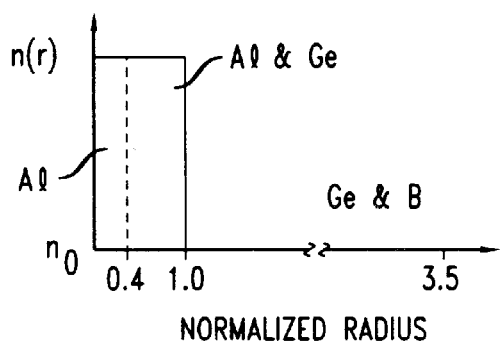
FIG. 2a and 2b schematically depicts n(r) and p(r) of a further prior art fiber.
Figure 2B:
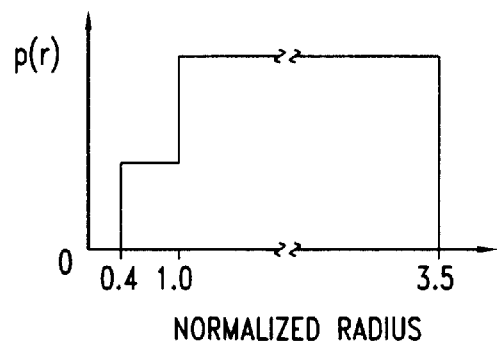

FIG. 2 schematically depicts another prior art fiber wherein the refractive index profile is not proportional to the photosensitivity profile. See M. J. Holmes et al., ECOC '99 (op.cit.). The fiber also had a tilted grating and serves as a sidetap filter. The fiber had a step-function refractive index profile to normalized radius 1.0, with refractive index $n_0$ for the normalized radius greater than 1.0. The core was doped with a non-photosensitive core dopant (e.g., aluminum) to normalized radius 0.4, and with a combination of the non-photosensitive core dopant and germania to normalized radius 1.0. The region from normalized radius 1.0 to 3.5 was doped with germania, to which boron was added to reduce the cladding index to $n_0$.

Figure 3:
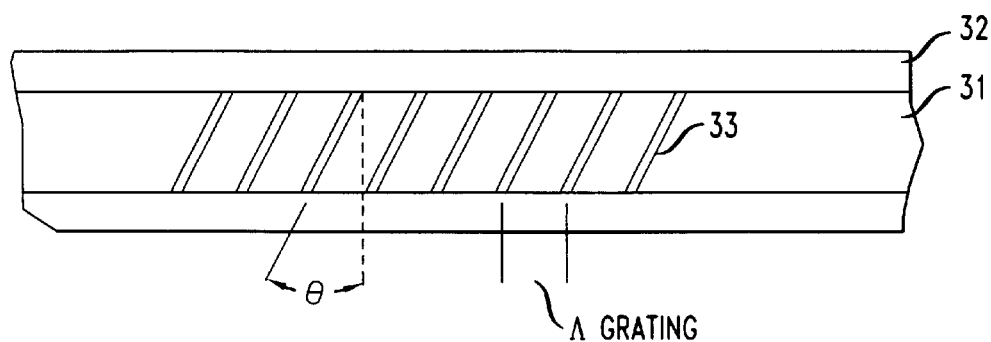
FIG. 3 schematically shows a prior art single mode optical fiber, with tilted refractive index grating in the core, with radially constant photosensitivity.

FIG. 3 schematically depicts a length of prior art silica-based optical fiber with a tilted Bragg (refractive index) grating. Numerals 31–33 refer respectively to the fiber core, the fiber cladding and the regions of increased refractive index that form the Bragg grating. The spacing between adjacent regions 33 is designated $\Lambda_{grating}$, and the tilt angle of the regions 33 with respect to the transverse dimension of the fiber is designated $\theta$. $\Lambda_{grating}$ is not necessarily constant over the length of the grating.

In a single mode fiber as shown in FIG. 3, the core mode reflectivity ($LP_{01,f}$ to $LP_{01,b}$) depends on the normalized coupling strength K, which is proportional to the ($\theta$-dependent) overlap integral, $$\kappa(\theta) = \frac{\int E_{core}^2 \cdot J_o(K_{grating} r \sin\theta) \cdot W(r) r dr}{\int E_{core}^2 r dr}$$

where $E_{core}$ is the electric field of the core mode, $K_{grating}$ is the wave vector of the grating, and $\theta$ is the tilt angle. The Bessel function $J_o$. arises from the azimuthal integration and is unity when $\theta=0$. W(r) is a radially-dependent weighting function which is proportional to the photosensitivity profile p(r). In fibers according to the invention, W(r) is not constant as a function of r, with p(r) having at least two levels of photosensitivity, at least one of which can be zero.

The weighting function may be defined via the full index modulation of the tilted grating:

$$\delta n(r,\phi,z) = \delta n \cdot W(r) \exp(iK_{grating} \sin\theta r \cos\phi + iK_{gating} \cos\theta z), \quad 2)$$

where $\phi$ is the azimuthal angle in cylindrical coordinates, and $\delta n$ is the amplitude of the index modulation. In a uniformly photosensitive fiber, W(r) is the same as the index profile and is unity up to the core radius. Herein we consider fibers in which W(r) is not uniform.

Figure 4:
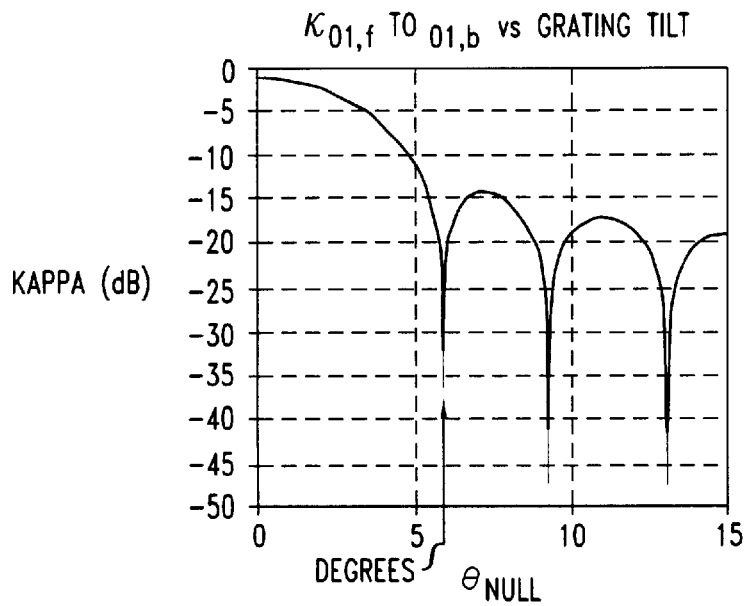
FIG. 4 shows the $LP_{01,f}$-$LP_{01,b}$ coupling constant κ of an exemplary prior art tilted grating as a function of tilt angle θ, with several regular nulls.

FIG. 4 shows the magnitude of the overlap integral in dB of a prior art fiber as a function of the grating tilt. As can be seen from FIG. 4, the overlap (and hence the core mode reflection) is nulled (defined as less than −30 dB) for only a very small angular range (about 0.1 degrees) around the $\theta$ null values, making core mode nulling very angle-sensitive.

We have discovered that the shortcoming of prior art tilted Bragg gratings can be overcome by the use of fibers in which p(r) is controlled independently of the index profile n(r). Gratings in such fibers can be less angle-sensitive and thus more manufacturable than prior art fibers with p(r) proportional to n(r).

For instance, by removing (or decreasing) the photosensitivity over a predetermined radial range of the fiber core (that region to be referred to as the "tuning region"), the tilt condition for the second null may be altered so that it is almost the same as that for the first null, i.e., such that a supernull results.

Figure 5:
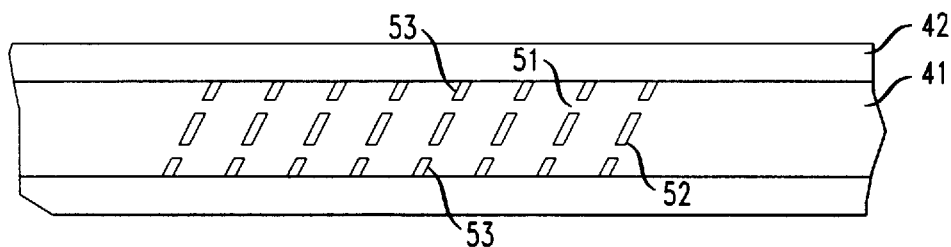
FIG. 5 schematically shows a fiber cross section with a tilted refractive index grating according to the invention, with an annular region of zero photosensitivity in the core of the fiber.

FIG. 5 schematically shows an exemplary fiber grating according to the invention. Numerals 41 and 42 refer to the fiber core and the cladding, respectively, and numeral 51 refers to the annular tuning region that has low (frequently zero) concentration of photosensitizing species. The tuning region extends from $r_{t1}$ to $r_{t2}$. By way of example, the core region 52 from r=0 to r=$r_{t1}$, contains an effective concentration of germania to give the desired refractive index $n_c$ and photosensitivity, the tuning region 51 from $r_{t1}$ to $r_{t2}$ is essentially free of germania but contains a sufficient concentration of index-raising dopant (e.g., Al and/or P) to give the region the desired refractive index $n_c$, and the core region 53 from $r_{t2}$ to the core radius $r_c$. contains said effective concentration of germania.

It will be understood that practice of the invention is not limited to fibers having a step index core, a single "tuning region" from $r_{t1}$ to $r_{t2}$, and a tuning region that is substantially free of photosensitizing dopant. Indeed, the invention can be embodied in fiber that has a graded index core (e.g., parabolic or triangular), can also be embodied in a fiber that has more than one tuning region, and can furthermore be embodied in fiber that has a tuning region containing some photosensitizing species, typically less than about 50% of the average concentration in the core outside of the tuning region.

Figure 6:
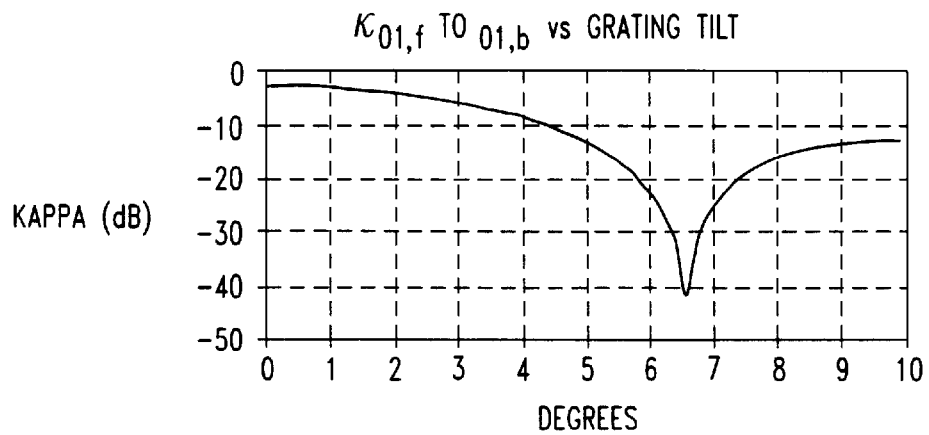
FIG. 6 shows the $LP_{01,f}$-$LP_{01,b}$ coupling constant κ of an exemplary tilted grating according to the invention as a function of tilt angle θ, with a supernull at θ~6.5°.

Appropriate choice of the parameters of the tuning region or regions (width, radial placement, possibly the concentration of a photosensitizing species) can result in a Bragg grating having significantly reduced nulling sensitivity. This is illustrated in FIG. 6, which shows the core-core ($LP_{01,f}$-$LP_{01,b}$) coupling constant vs. tilt angle. The curve of FIG. 6 was computed using Equation 1, assuming the following parameters: core radius 4 $\mu$m, $r_{t1}$=1.8 $\mu$m, $r_{t2}$=2.5 $\mu$m, and $\Delta n$=0.35%, with zero photosensitivity in the tuning region.

As can be seen from FIG. 6, the tilt angle dependence of the overlap integral is considerably reduced, as compared to a prior art grating, with a "super null" having opened up for a significant range of tilt angle, making the nulling angle relatively insensitive in gratings according to the invention. This insensitivity of course translates into improved manufacturability.

Figure 7A:
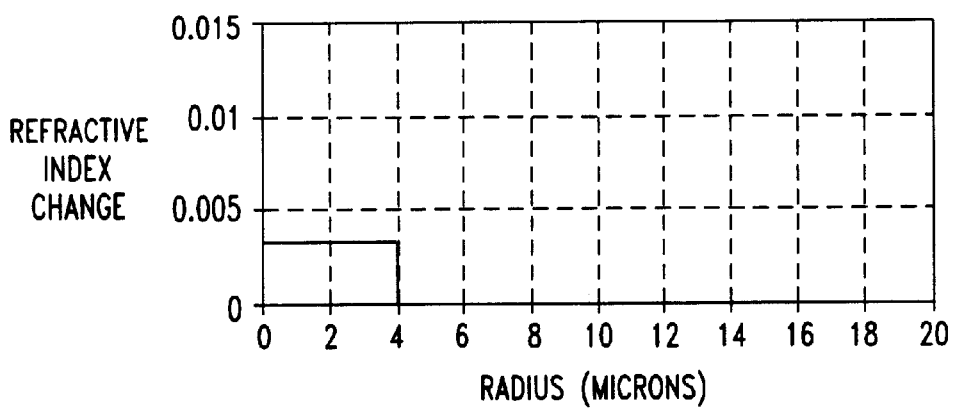
FIGS. 7a–c respectively show n(r), p(r) and electric field of the fiber of FIG. 6.
Figure 7B:
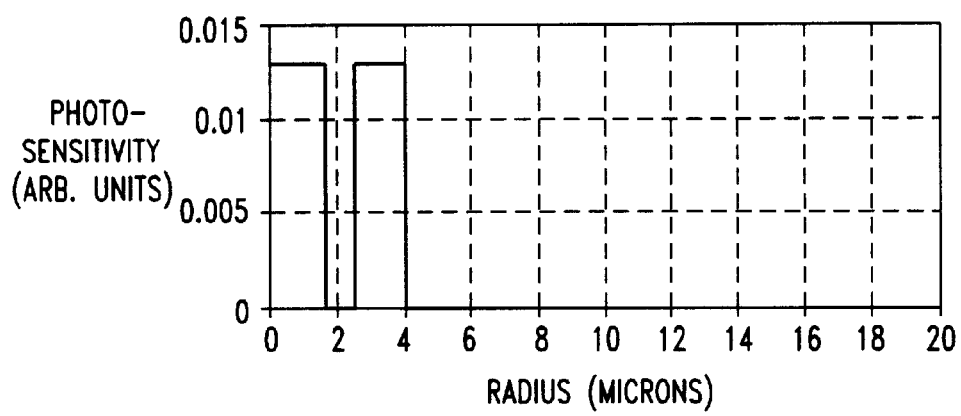
Figure 7C:
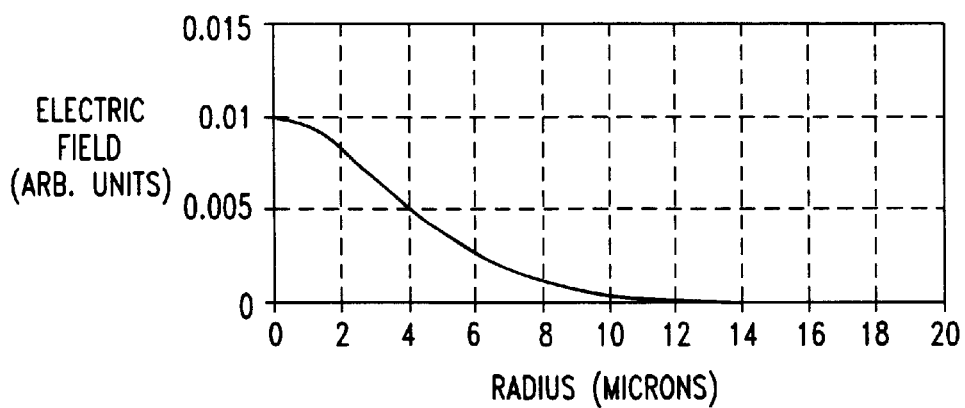

FIGS. 7a–c show, respectively, the refractive index profile n(r), photosensitivity profile p(r) and electric field of the fiber of FIG. 6. It will be understood that the weighting function W(r) expresses the radial variation of the photosensitivity.

So far the discussion has been mostly in terms of silica-based optical fiber with Ge as both an index-increasing species and a photosensitizing species, with P or Al as index-increasing species that are not photosensitizing and with F and B as index lowering species that are not photo-sensitizing. This was for the sake of definiteness only, but the invention is not so limited. For instance, $GeO_2$ (germania) is at least in principle not the only possible index-increasing photosensitizing species, and B and P could also serve as photosensitizing species. Photosensitivity exemplarily can be reduced by replacing Ge with P, replacing Ge with Al, and by replacing P with Al, the latter being advantageously used for photosensitivity at about 193 nm.

UV trimming can also be applied to fibers that exhibit photosensitivity at only one wavelength. In this case the entire index profile is raised, resulting in increased confinement of the core mode and in altering $\kappa$. This approach however is less preferred since the grating strength will change during trimming.

A tilted Bragg grating according to the invention exemplarily can be made by a process that comprises providing an optical fiber having a tuning region that is photosensitive at a first UV wavelength (e.g., 193 nm) but is substantially not photosensitive at another UV wavelength (e.g., 242 nm). After exposure of the optical fiber to radiation of the first wavelength such that a tilted Bragg grating is formed in the fiber, the grating can be adjusted ("trimmed") by exposure to the other UV wavelength, whereby the nulling condition can be adjusted.

Those skilled in the art will recognize that the invention is not limited to optical fiber but can, at least in principle, also be practiced with tilted gratings in a planar optical waveguide, and will also recognize that the refractive index profiles and photosensitivity profiles shown herein are exemplary and schematic, with actual profiles exhibiting unavoidable departures from the nominal or schematic profiles, due, for instance, to burn-off.

FIG. 8 schematically depicts an optical fiber communication system 80 that includes refractive index gratings according to the invention. Signal radiation from transmitter 81 is coupled into conventional transmission fiber 83, wherein it propagates to receiver 82. Intermediate transmitter and receiver is one or more optical fiber amplifiers. By way of example, the communication system comprises a 2-stage amplifier, with the input stage comprising EDFAs (Er-doped fiber amplifiers) 861, 862 and 863, and the output stage comprises EDFA 864. The input stage is pumped by pump radiation source 84 (exemplarily 100 mW at 980 nm), and the output stage is pumped by pump radiation source 85 (exemplarily 110 mW at 1480 nm. The pump radiation sources are conventional, as are optical isolators 871, 872 and 873 and WDM couplers 881 and 882. Disposed between EDFAs 861 and 862 is tilted fiber Bragg grating 891, and disposed between EDFAs 862 and 863 is tilted fiber Bragg grating 892. Bragg gratings 891 and 892 are gratings according to this invention, with $\Delta n=10_{-3}$, $L=1$ cm, and index and photosensitivity profiles as in FIGS. 7a–c, selected to provide strong ASE filtering over the 1530–1560 nm wavelength range.

The communication system 80 exemplarily is designed for multi-channel operation in the so-called L-band, with 7 channels equi-spaced in the 1570–1600 nm band. However, those skilled in the art will appreciate that tilted Bragg gratings according to the invention can be advantageously used whenever a strong, broad-band filter is required.

We claim:

1. An article comprising a tilted refractive index grating having a tilt angle θ and extending longitudinally over at least a portion of a single mode optical waveguide having a core and a cladding that surrounds the core, the core having a dopant distribution selected to provide a radial refractive index profile n(r) and a radial photosensitivity profile p(r), where n and p are the refractive index and the photosensitivity, respectively, and r is the radial coordinate of the optical waveguide, where p(r) varies as a function of r in the core, with p(r) having at least two levels of photosensitivity in the core, said tilted refractive index grating having a coupling constant κ(θ) that determines coupling between a forward propagating core mode of said wavelenght λ and a reflected core mode of wavelength λ;

CHARACTERIZED IN THAT
a) p(r) is selected such that p(r) is independent of n(r) and has at least one tuning region of differing photosensitivity within the core of the single mode optical waveguide; and
b) n(r) and p(r) are selected such that κ(θ) is less than −30 dB over a range of θ that is greater than 0.1°, whereby manufacture of a tilted refractive index grating having substantially no reflected core mode is facilitated.

2. An article according to claim 1, wherein p(r) is selected such that the refractive index grating has a bandwidth greater than 20 nm and a cladding loss greater than 20 dB.

3. Article according to claim 1, wherein in said tuning region the photosensitivity is at most 50% of the average photosensitivity of the core outside of the tuning region.

4. Article according to claim 3, wherein said tuning region does essentially not exhibit photosensitivity.

5. Article according to claim 1, wherein the core nominally has a step function refractive index profile.

6. Article according to claim 1, wherein said range of θ is greater than 0.2°.

7. Article according to claim 6, wherein said range of θ is greater than 0.5°.

8. Article according to claim 1, wherein p(r) is selected such that there is substantially no photosensitivity in the cladding.

9. Article according to claim 1, wherein in said tunning region
  i) P is substituted for at least some Ge; or
  ii) Al is substituted for at least some Ge; or
  iii) Al is substituted for at least some P.

10. Article according to claim 1, wherein said article is an optical fiber communication system comprising a transmitter spaced apart from a receiver, with an optical fiber transmission path signal-transmissively connecting said transmitter and receiver, wherein said transmission path comprises at least one tilted refractive index grating according to claim 1.

11. Article according to claim 1, wherein said tuning region is selected to be photosensitive at a first UV wavelength and is substantially not photosensitive at a second UV wavelength, such that a nulling condition of the tilted Bragg grating can be adjusted after formation of the Bragg grating in the fiber.

* * * * *